(No Model.) 2 Sheets—Sheet 1.
W. W. WILLSON.
CONVEYER.
No. 587,901. Patented Aug. 10, 1897.
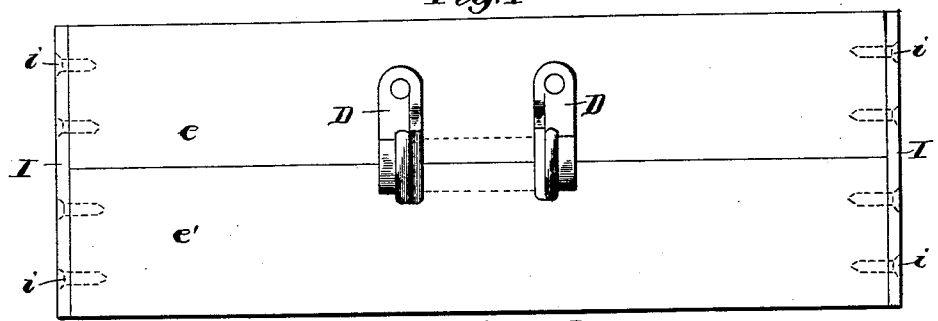
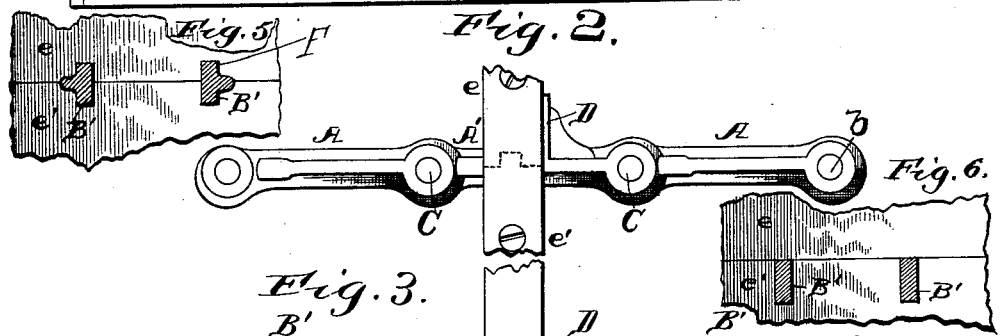
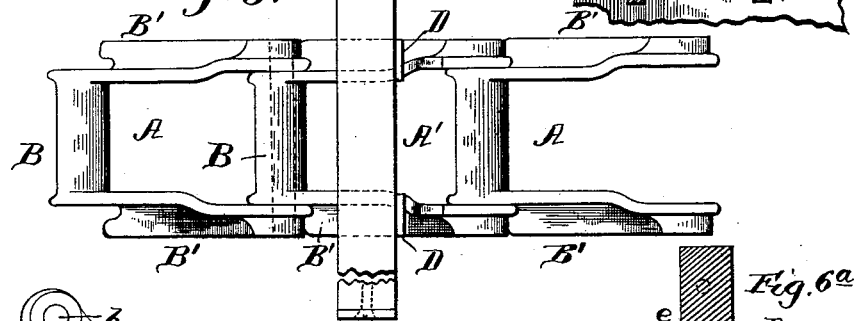
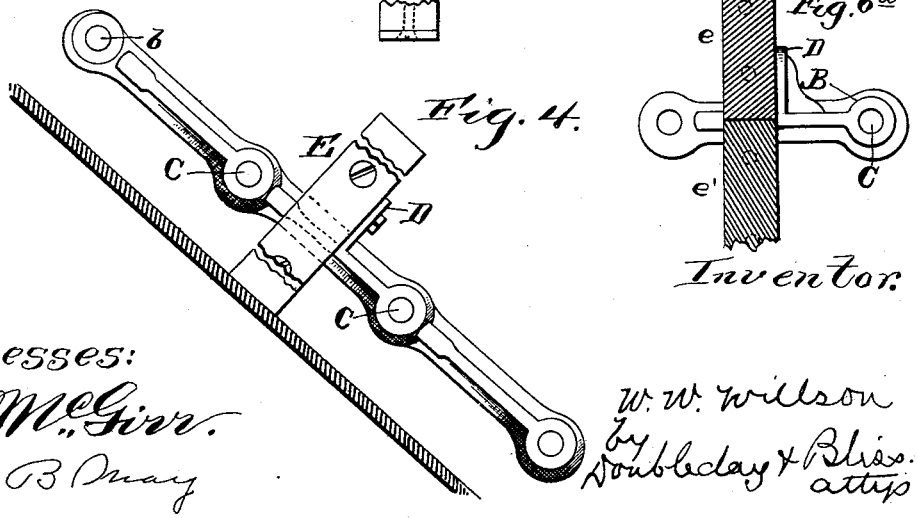
Witnesses:
J. B. McGirr.
M. B. May
Inventor.
W. W. Willson
by Doubleday & Bliss
attys (No Model.) 2 Sheets—Sheet 2.
W. W. WILLSON.
CONVEYER.
No. 587,901. Patented Aug. 10, 1897.
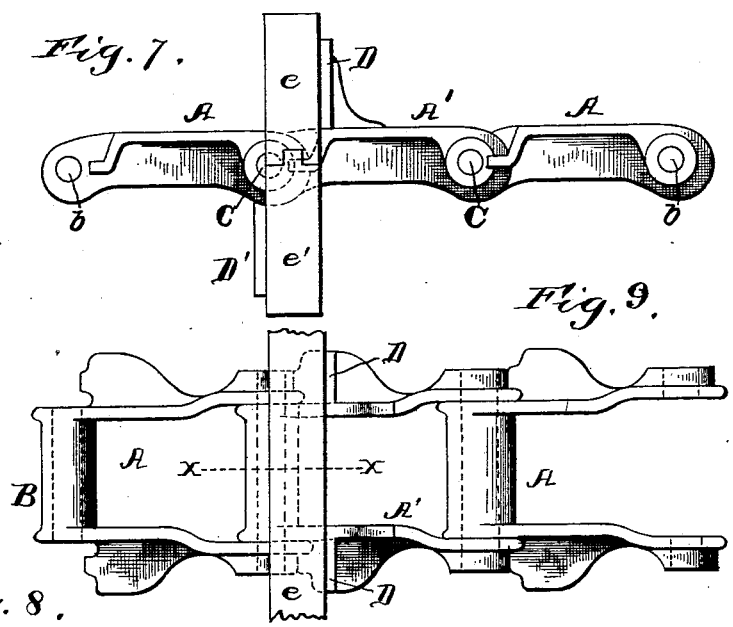
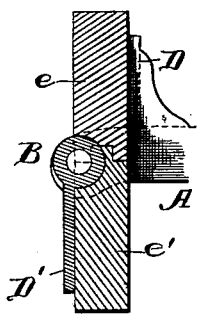
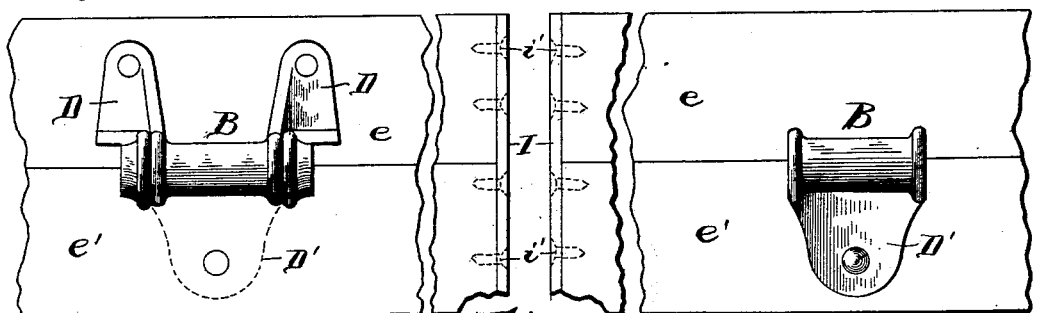
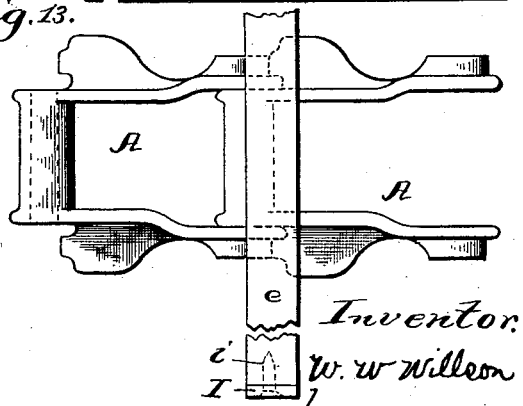
Witnesses:
J. B. McGinn.
L. H. Orleman.
Inventor.
W. W. Willson
by Doubleday & Bliss
attys

UNITED STATES PATENT OFFICE.

WILLIAM W. WILLSON, OF COLUMBUS, OHIO, ASSIGNOR TO JOSEPH A. JEFFREY, OF SAME PLACE.

CONVEYER.

SPECIFICATION forming part of Letters Patent No. 587,901, dated August 10, 1897.

Application filed September 5, 1890. Serial No. 363,989. (No model.)

*To all whom it may concern:*

Be it known that I, WILLIAM W. WILLSON, a citizen of the United States, residing at Columbus, in the county of Franklin and State of Ohio, have invented certain new and useful Improvements in Means for Securing Flights or Buckets to the Links of a Chain Conveyer, of which the following is a specification, reference being had therein to the accompanying drawings.

This invention relates to an improvement in conveyers or carriers and in the means for attaching to the links of a chain the flights or buckets by which the carrier or conveyer is enabled to engage with and transport or elevate the material under treatment.

Figure 1 is a face view of a flight or bucket and showing a chain-link engaging therewith. Fig. 2 is an edge view of the same. Fig. 3 is a plan view. Fig. 4 is an end view of the flight working on an inclined path. Fig. 5 is a cross-section through the chain, showing the flight in face view. Fig. 6 is a similar view showing the recesses for the side bars of the link in but one section of the flight. Fig. 6ᵃ is a sectional view of a modified form of flight in which the two sections or members are not connected by a tongue-and-groove joint. Figs. 7, 8, 9, and 10 illustrate a modification in which the link is provided with upwardly and downwardly extending projections, to which the flight-sections are secured. Figs. 11, 12, and 13 show another modification in which the link projections extend downwardly.

In the drawings a chain is shown having links A A', the links A' being those to which the flights or buckets are attached and being placed at intervals. The links shown are each composed of a tubular end bar B and two side bars B' B', the latter having apertures $b$ $b$ and being joined to the end bars B of an adjacent link by means of pintles C.

The links A', in addition to the features above set forth, have special features of construction by which they can be readily united to the buckets or flights. Each side bar of each of these links A' has a projection or plate-like finger D extending upward therefrom. These are shown as being formed integrally with the chain-link and as having one or more apertures to receive screws or similar fastening devices by which the flight or bucket can be attached to said projections D.

The flights or buckets are represented by E. Each is made in two parts $e$ $e'$, preferably separated at the central line and having a tongue-and-groove joint formed by their adjacent faces, so that they can be united and form a perfectly tight joint. In the inner edges of the sections $e$ $e'$ are formed recesses or sockets F to receive the side bars of the link A' when the flight is applied thereto.

Heretofore in constructing carriers or elevators of this sort it has been customary to cut apertures or slots through the central part of each flight, and this I have found to be objectionable, as it necessitates considerable labor and renders it difficult to provide a tight joint at the chain-apertures. In some cases the links have to be cast with special plates or webs for closing such apertures. By forming the flight in two parts, separable on or substantially on the plane of the link, I render it possible to rapidly and cheaply construct the carrier and to have the joints all tight. The slots or recesses in the edges of the flight-sections are more easily made and the link-bars can be more readily inserted therein than is possible when the apertures are formed in the central part of a solid flight— that is, a flight consisting of but one piece.

If preferred, the recesses for the side bars can be formed entirely in one member or section of the flight instead of being formed in both sections, such a construction being illustrated in Fig. 6. Also, while I prefer to form between and connect the two sections of the flight by a tongue-and-groove joint, as shown in Fig. 2, yet that is not necessary under all circumstances, and the adjacent edges of the sections may be plain and fitted close together, as shown in Fig. 6ᵃ.

The sections or members $e$ $e'$ of the flight are secured together by means of fastening-bars I I, shown as extending across or along the vertical edges of the flight. These bars are firmly secured to the flight by screws $i$, passing through suitable apertures in the bars. Of course it will be understood that I do not limit myself to this precise way of fastening the two parts of the flight together, as there are numerous devices by which it can be done.

Also, while I prefer to fasten the flight-sections to the chain in the manner above described—that is, in such way that only one of such sections shall be rigid with the chain, thereby providing for shrinkage or expansion and insuring a tight joint between the sections—yet sometimes I find it convenient, particularly in conveyers for moving heavy material, to secure both the separable parts of the flight directly to the link. When these parts are thus secured, the link acts as a part of the fastener for securing them together. Such a construction is clearly shown in Figs. 7 to 10. By examining these figures it will be seen that the link, as heretofore described, is provided with a projection D, extending upwardly from each of the side bars, to which projections the part e of the flight is secured in any suitable way, as by rivets, bolts, &c. The fastener for the part e' of the flight is provided by means of a downwardly-extending projection D', formed on the tubular end bar B of the link. The projections D D' lie in different vertical planes, far enough apart so that the flight as a whole can lie between them, it being in substantially the vertical plane of the pintle C, as shown in Figs. 7, 9, 11, and 13, so that the latter is more or less inclosed by it. Such a construction is, as before stated, adapted for conveying heavy material, the strips I materially aiding the fastening projections on the link and connecting the sections of the flight together in a strong and durable manner.

In Figs. 11, 12, and 13 a form is shown in which the upper ears D D are dispensed with and the lower one at D' is retained—that is, in this construction the lower section of the flight is rigidly secured to the chain-link and the upper section and lower section are connected by the bars I in the manner before described.

I am aware that prior to my invention it has been proposed to provide chain-links with projections extending from their side bars and to secure flights or scrapers to such projections; but with such earlier constructions it was necessary, in order to have the flight supported to extend on opposite sides of the chain, to provide two oppositely-extending sets of lugs or projections, and thereby the weight and cost of manufacture of the chain were increased. Again, links formed in this manner were not adapted for supporting flights when arranged to operate on one side of the chain only, because of the integral projecting lugs on the opposite side. By my construction it is possible to attach to the chain-links flights which will project beyond but one side or face of the chain, if desired, or to support flights which shall operate on both faces of the chain, the point of attachment to the chain in both cases being on one side only.

I am also aware that it has been proposed to construct a conveyer-chain with sprocket attachments, adapted to serve as flights to a limited extent, which were separable on the plane of the chain; but in this case the links of the chain alternately extended in planes at right angles, and the power thereof was transmitted from or to the sprocket-wheels solely through the flight attachments. To adapt such a construction for the purposes of my invention, it was necessary to employ additional disks or plates. It has also been proposed to connect two boards together for various purposes by means of fastening strips or devices extending from one board to the other, or to connect the adjacent edges of two pieces of board by a tongue-and-groove connection, and I make no claim for such an arrangement for any and all purposes; but I believe myself to be the first to provide a conveyer-flight which shall be supported entirely from one side of a sprocket-chain and yet consist of two sections extending on opposite sides of the chain, but so connected as to form a continuous surface from the top to the bottom edge.

By arranging the upwardly and the downwardly extending lugs in different planes I am enabled to clamp the flight firmly between such projections.

What I claim is—

1. In a carrier or conveyer, the combination of a sprocket-link having a projection extending from one face, a flight formed in two sections, one of which is secured directly to the said projection on the link, and means, independent of the connection between the said flight-section and the link, for holding the other flight-section in position on the opposite side of the link from that aforesaid and connecting said flight-sections securely together, substantially as set forth.

2. In a carrier or conveyer, the combination of a sprocket-link having on each side bar a lug or projection, a flight-section secured to said lugs, a second flight-section arranged on the opposite side of the link from the first said flight-section, and devices, independent of the link and the flight-fastening devices thereon, for connecting the two flight-sections together and supporting the second said flight-section, substantially as set forth.

3. In a carrier or conveyer, the combination of a chain-link having two oppositely-extending lugs or projections arranged in different transverse planes, a flight-section arranged in a plane between said lugs or projections and connected to one of the said lugs or projections, and another flight-section arranged on the opposite side of the link in line with the first said flight-section and secured to the other lug or projection, substantially as set forth.

4. In a carrier, the combination of a chain-link having a lug or projection extending from each side bar in one direction, and a projection extending in the opposite direction from one of its end bars, and out of line with the projections on the side bars, a flight-section arranged on one side of the chain-link and secured to the projections on the side bars, thereof, another flight-section arranged on the opposite side of the link and connected with the projection on the end bar, and means, independent of the link, for connecting said flight-sections together, substantially as set forth.

5. In a carrier, the combination of a chain-link having a lug or projection extending from each side bar, and lying within the side lines of the link, and a projection extending from an end bar, between the side bars, in a direction opposite to that of the aforesaid projections, a flight-section connected to the lugs on the side bars, and another flight-section connected to the lug or projection on the end bar, substantially as set forth.

6. The combination of a chain-link having a projection extending from one side thereof, the flight formed of two sections united by a tongue-and-groove joint on a line in the plane of the link and each section having formed in its inner edge recesses for the side bars of the link, means for fastening one of the sections of the flight to the aforesaid projection on the link, and means, independent of the link for fastening the parts of the flight together, and holding the second said flight-section in position, substantially as set forth.

In testimony whereof I affix my signature in presence of two witnesses.

WILLIAM W. WILLSON.

Witnesses:
WALTER H. MARTIN,
WILLIAM F. GARRETT.